United States Patent
Shepelyakovsky et al.

[15] 3,682,519
[45] Aug. 8, 1972

[54] ANTIFRICTION BEARING

[72] Inventors: Konstantin Zakharovich Shepelyakovsky; Boris Konstantinovich Ushakov; Vasily Petrovich Devyatkin; Vladimir Fedorovich Devyatkov; Vasily Ivanovich Shakhov; Nikolai Nikolaevich Kachkanov; Leon Alexandrovich Gazarov; Valentina Mikhailovna Pchelkina, all of Moscow; Mikhail Alexandrovich Derbunov, Kharkov; Vladislav Valentinovich Vologdin, Leningrad, Isaak Nokhimovich Shklyarov; Veniamin Davydovich Kalner, both of Moscow, all of U.S.S.R.

[73] Assignee: Moskovsky Vecherny Metallurgishesky Institut, Moscow, U.S.S.R.

[22] Filed: July 15, 1970

[21] Appl. No.: 55,100

[52] U.S. Cl. .................................................308/212
[51] Int. Cl. .............................................F16c 32/22
[58] Field of Search.......308/241, 187, 193, 195, 008

[56] References Cited

FOREIGN PATENTS OR APPLICATIONS 544,247    4/1942    Great Britain.............308/008

Primary Examiner—Martin P. Schwadron
Assistant Examiner—Frank Susko
Attorney—Waters, Roditi, Schwartz & Nissen

[57] ABSTRACT

The present invention relates to the antifriction bearings used, in particular, on railway transport.

The invention consists in that the races and rolling elements of the bearing have a constant chemical composition of steel throughout their volume with a carbon content of 0.8 – 1.2 percent and have a hardened layer at least on the rolling surfaces with a hardness of 58 – 65 HRC, the depth of this layer being 0.1 – 0.3 of the wall thickness of the race, and hardened to 30 – 45 HRC.

The invention also claims a method of heat treatment of the races and rolling elements wherein surface hardening is carried out by a single through heating to temperatures above $A_I$ and by intensive cooling.

4 Claims, 2 Drawing Figures

PATENTED AUG 8 1972　　　3,682,519

ANTIFRICTION BEARING

The present invention relates to antifriction bearings used in particular, in railway rolling stock.

While in operation, the bearing races and rolling elements are subjected to heavy contact, impact and static loads. Therefore, they should possess a high resistance to contact stresses combined with sufficient strength.

At present, the antifriction bearings are manufactured according to two methods.

In the first method the bearings are made of alloy steel with 0.9 – 1.1 percent carbon. The bearing races and rolling elements are hardened by through heating, and tempered at a low temperature. This type of heat treatment produces an identical hardness of the races and rolling elements across the entire section, this hardness ranging from 58 to 64 HRC. This results in an unfavorable distribution of internal residual stresses in the bearing races and rolling elements and in a high sensitivity to various concentrations of stresses (non-metallic inclusions, grinding burns, notches, etc.). This impairs sharply the reliability of the bearings.

In the second method the bearings are made of low-carbon alloy steels. The races and rolling elements are case-hardened 1.0 – 3.0 mm deep, normalized or annealed, then hardened and tempered at a low temperature. After such a heat treatment the hardness the races and rolling elements varies from 58 to 64 $R_c$ in the case-hardened surface layer, dropping to 30 – 45 HRC in the core. This method of bearing manufacture calls for a very long case-hardening process (in excess of 20 hours), expensive and bulky equipment and some means of regulating the process. All this inevitably brings about a raise in the cost of the bearings.

It is an object of the present invention to provide an antifriction bearing which would feature higher structural strength, reliability in operation and durability as compared to the prior art bearing. Another object of the present invention is to provide an antifriction bearing manufactured from less expensive steel, as ultra pure electroslag refined steel is not required.

Still another object of the present invention is to provide a method of heat treatment for the races and rolling elements which would be less durable and less labor-consuming in comparison with exisling.

Other objects and advantages of the present invention will be apparent from the following description.

These and other objects are accomplished by providing a bearing comprising races with rolling elements between them wherein, according to the invention, the races and rolling elements have a constant chemical composition of steel throughout their volume, the hardenability of said steel being confined at the maximum and minimum limits to satisfy the relation $d_{cr} = (0.7 - 1.4)S$ where $S$ – thickness of race wall, $d_{cr}$ – critical diameter, i.e. the diameter of a cylindrical specimen of this steel, hardened by through heating and rapid cooling (for example by a high speed water shower) to a hardness of 55 HRC, in the center these races having a hardened layer with a hardness of 58 – 65 $R_c$, the depth of the hardened layer constituting 0.1 – 0.3 of the race wall thickness, with the core hardened to 30 – 45 HRC.

This method also ensures that the races and rolling elements should have a hardened layer over the entire surface.

The races and rolling elements may be made of steel containing 0.9 – 1.1 percent carbon, 0.3 – 0.5 percent chromium, 0.1 – 0.3 percent silicon, and 0.1 – 0.3 percent manganese.

The races and rolling elements may also be made of steel containing 0.9 – 1.1 percent carbon, 0.4 – 0.6 percent chromium, not over 0.1 percent silicon and 0.1 – 0.3 percent manganese.

For manufacturing said bearings we hereby propose a method of heat treatment of the races and rolling elements wherein, according to the invention, the races and rolling elements are surface hardened by a single through heating to temperatures above $A_l$, and by intensive cooling.

It is expedient that the hardened races and rolling elements be intensively cooled with high speed shower or stream of water.

After hardening, the races and rolling elements are subjected to a low-temperature tempering. This may take the form either of "self-tempering" by the heat remaining in the hardened race or rolling element in case of incomplete cooling, or by additional tempering in a furnace.

Due to regulated upper and lower limits of steel hardenability, the surface of the hardened races and rolling elements asquires a martensite layer whose depth is 0.1 – 0.3 of the race thickness, hardness 63 – 67 HRC, while their deeper parts have a structure of fine-grained ferrite-cementite mixture of the troos titic or sorbitic type with a hardness of 30 – 45 HRC depending on the size of the races and rolling elements. The core hardness of the races or rolling elements rises with the decrease of of their thickness. In the races whose wall thickness is about 15 mm, the martensite layer is 2.5 – 3.5 mm thick. In this case carburizing is not required. After tempering at 150°– 180° C., the surface hardness is in the range from 62 to 64 HRC. Such distribution of harness across the section of the races and rolling elements of a bearing ensures a favorable distribution of residual internal stresses, and creates internal compressive stresses in the surface layers which improves fatigue strength and reduces the sensitivity of the races and rolling elements to concentrations of stresses. A high surface hardness of the races and rolling elements with the above-specified carbon content ensures their high contact strength while a reduced content of residual austenite and a lower degree of alloying of steel increase the stability of their dimensions.

Usually, steels with 0.8 – 1.2 percent carbon content are protected against cracking during hardening by oil quenching which restricts the hardness of steel to a certain extent after hardening. Contrary to the prevailing practice, we propose that steels with the above-specified carbon content and regilated hardenability, should be surface-hardened by through heating and cooling with an intensive shower or stream of water.

The races and rolling elements hardened by this method and made of the above-specified steel are harder by 3 – 4 Rockwell units than the oil-quenched ones and are completely devoid of cracks.

The realization of the present invention increases the structural strength, operational reliability and durability of the antifriction bearing along with a substantial decrease of its cost due to a reduction in the degree of steel aloying, in the duration of heat treatment and amount of labor involved in heat treatment, and owing to smaller grinding allowances for the races and rolling elements. Besides, a possibility presents itself of automating the process of heat treatment of the bearing races and rolling elements directly in the production line.

Now the invention will be described by way of example with reference to the drawings, in which.

Figure 1:
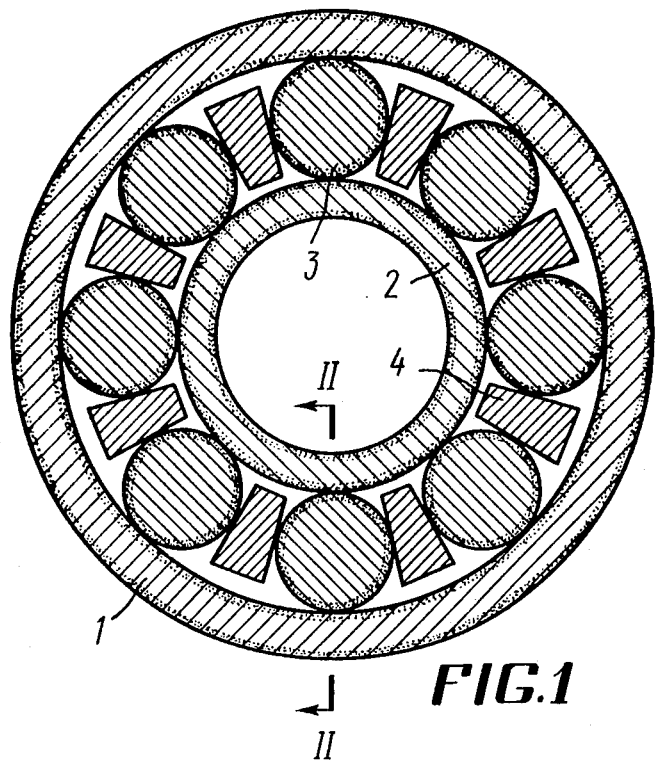
FIG. 1 is a cross section of antifriction box bearing for railway cars realized in accordance with the invention, illustrating the macrostructure of races and rolling elements.
Figure 2:
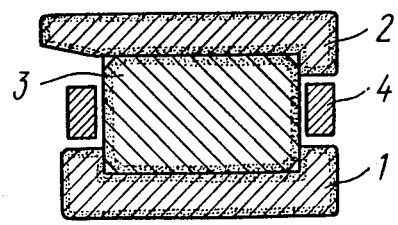
FIG. 2 is a section taken along line II—II in FIG. 1.

The roller bearing for railway car axle boxes comprises an outer race 1 (FIGS. 1, 2), an inner race 2 with rollers 3 between them, and a cage 4. The outer race 1 is installed rigidly in the seat (not shown), the inner race is press-fitted on the wheel axle (not shown). The inner and outer races and rollers are subjected to heavy contact stresses in operation. Besides, the bearing suffers impact loads originated by wheels striking rall rail joint, etc. Therefore, along with a high contact strength, the races and rollers should resist impact loads and have a high bending strength.

These requirements are satisfied by the bearing whose races and rolling elements are made of steel with regulated upper and lower hardenability limits, containing 1.0 percent carbon, 0.4 percent chromium, 0.22 percent silicon, 0.22 percent manganese. The hardness of the surface layer is 62 – 64 HRC 2.5 – 3.5 mm in depth. This hardness gradually decreases to 35 – 45 HRC from the surface towards the core.

The method of heat treatment of races and rollers made of above-specified steel and producing nonuniform hardness across their section consists in hardening them by through induction heating to 830°– 850° C. with intensive all-round cooling by a high speed shower or stream of water, followed by tempering at 150 – 180° C.

This heat treatment produces a layer of martensite 2.5 – 3.5 mm deep on the entire surface of the races and rollers this layer having a hardness of 62 – 64 HRC; the layer of martensite is followed by troostite and trostosorbite, so that the hardness is gradually reduced from the martensite layer towards the core, reaching 35 – 45 HRC. A high surface hardness with a carbon content of 1 percent ensures a high contact strength while the combination of the hard surface layer with a tough core, the residual internal compressive stresses at the surface being 60 – 80 kg/mm² produces a high fatigue strength and a low sensitivity to the concentrations of stress.

The results of tests (see Table) have shown that the resistance to rolling contact loads of the proposed races is 1.5 – 2 times higher, bending strength 2 times higher, and static loading strength 33.6 percent higher than those of the races made of high-quality alloy steel of electroslag refining 1 percent carbon, 1.5 percent chromium, 0.6 percent silicon, 1.5 manganese, and having a uniform hardness of 58 – 62 HRC throughout their section. Besides, the fatigue strength of the proposed races with an artificially applied stress concentration in the form of a pin-point burn has decreased by 15 percent only and has remained higher by 70 percent than that of the through-hardened races without the stress concentration whereas the fatigue strength of the through-hardened races with an identical stress concentration has decreased by 43 percent.

Strength characteristics of the inner race of a roller bearing for railway car axle boxes determined by contact, fatigue and static strength tests

| Steel | Type of heat treatment | Static breaking load | Contact strength (hours of operation on stand under 400% overload before contact failure) | Max. breaking load under repeated bending stress (test basis 2 million cycles) | |
|---|---|---|---|---|---|
| | | | | without stress concentrations | with artificial stress concentration (pin-point burn) |
| | | T | hours | T | T |
| proposed steel with definite upper and lower hardenability limits, containing C—1.0%, Cr—0.42%, Si—0.22%, Mn—0.20% | surface hardening after through induction heating with intensive cooling by stream of water, tempering at 150°C. surface hardness 62–64 HRC, depth of martensite layer 3 mm, core hardness 38 HRC | 40 | 1300 | 14 | 12 |
| Steel used at present C—0.95%, Cr—1.44%, Si—0.57%, Mn —1.04% after electroslag refining | Hardening After through heating in furnace followed by oil quenching. Tempering at 180°C. Hardness throughout entire section 60–62 HRC | | | | |

We claim:

1. An antifriction bearing comprising: inner and outer races; rolling elements located between said races; said races and rolling elements having a uniform chemical composition of steel throughout their volume and containing 0.8–1.2 percent carbon, the hardenability of said steel being confined at the upper and lower limits so as to ensure the following relation:

$$d_{cr} = (0.7-1.4)S$$

where $S$ = wall thickness of said race or the diameter of the rolling elements, such as a ball or roller; and $d_{cr}$ = critical diameter, which is the diameter of a cylindrical specimen made of said steel hardened by through-heating to the hardening temperature and by rapid cooling, such as for example water quenching, until it attains a hardness in the center thereof of 55 Rockwell C; and having a hardened layer of 58–65 Rockwell C hardness at least on the rolling surfaces thereof, the depth of said layer being 0.1–0.3 of the wall thickness of said races or of the diameter of said rolling elements, and a core hardened to 30–45 Rockwell C hardness.

2. An antifriction bearing according to claim 1 wherein said races and rolling elements are surface-hardened all over.

3. An antifriction bearing according to claim 1 wherein said races and rolling elements are made of steel containing 0.9–1.1 percent carbon, 0.3–0.5 percent chromium, 0.1–0.3 percent silicon and 0.1–0.3 percent manganese.

4. An antifriction bearing according to claim 1 wherein said races and rolling elements are made of steel containing 0.9–1.1 percent carbon, 0.4–0.6 percent chromium, not over 0.1 percent silicon and 0.1–0.3 manganese.

* * * * *